(12) United States Patent
Ori

(10) Patent No.: US 6,285,516 B1
(45) Date of Patent: Sep. 4, 2001

(54) PHOTOGRAPHIC LENS FOR ELECTRONIC STILL CAMERA

(75) Inventor: Tetsuya Ori, Kawaguchi (JP)

(73) Assignee: Fuji Photo Optical Co., Ltd., Omiya (JP)

(*) Notice: Subject to any disclaimer, the term of this patent is extended or adjusted under 35 U.S.C. 154(b) by 0 days.

(21) Appl. No.: 09/525,857

(22) Filed: Mar. 14, 2000

(30) Foreign Application Priority Data

Mar. 26, 1999 (JP) .................................................. 11-082940

(51) Int. Cl.$^7$ ............................... G02B 9/60; G02B 13/04
(52) U.S. Cl. ......................... 359/770; 359/753; 359/763
(58) Field of Search .................................... 359/770, 753, 359/763, 714, 758, 761

(56) References Cited

U.S. PATENT DOCUMENTS

| 5,528,428 | 6/1996 | Ohtake et al. ........................ 359/684 |
| 5,963,381 | * 10/1999 | Ori ........................................ 359/763 |
| 6,075,658 | 6/2000 | Nagahara ............................. 359/753 |

FOREIGN PATENT DOCUMENTS 2000-193884-A * 7/2000 (JP) .............................. G02B/13/04

* cited by examiner

Primary Examiner—Georgia Epps
Assistant Examiner—David N. Spector
(74) Attorney, Agent, or Firm—Arnold International; Bruce Y. Arnold

(57) ABSTRACT

A photographic lens for an electronic still camera having five lens components, with refractive powers in sequential order from the most object side, as follows: negative, positive, positive, negative and positive. A stop is positioned between the second lens component and the third lens component. The photographic lens has a short overall length, a wide angle of view, a large numerical aperture, and high resolution as a result of the lens being favorably corrected for aberrations. The first lens component includes at least one ashperical surface, the second lens component has a convex surface on the image side, the third lens component has at least one aspherical surface, and has a convex surface on the image side. The fourth lens component has a concave surface on the object side, and the fifth lens component has a convex surface on the image side.

8 Claims, 9 Drawing Sheets

Embodiment 1

Tangential          Sagittal

Coma

Embodiment 2

Tangential　　　　　　　　　　　Sagittal

Coma

Embodiment 3

ω = 32°

ω = 25.9°

ω = 17.7°

ω = 0°

Tangential    Sagittal

Coma

PHOTOGRAPHIC LENS FOR ELECTRONIC STILL CAMERA

BACKGROUND OF THE INVENTION

As personal computers have come into common use in the home, there has been increasing demand for electronic still cameras which can input image data into a personal computer. The photographic lens for an electronic still camera, however, must have a very short overall length, a sufficiently wide image angle, and so forth, in order to be incorporated into such a camera.

When using conventional CCD arrays for recording images under the VGA standard (having about 350,000 pixels) or the X&A standard (having about 800,000 pixels), the requirements for the photographic lens for such cameras could be met using a relatively simple lens system having a small number of lens elements and no aspherical surfaces. However, recently, electronic still cameras have been introduced having CCD arrays for recording images under the UXGA standard (having 2 million or more pixels). CCD's used for recording images under this standard have a smaller picture element size than previously, and there has been a market trend for the overall size of the CCD array to become larger, as well.

Thus, accompanying the introduction of the UXGA standard, there has been an increase in the resolution required of the photographic lens used with such a camera, as well as a need to provide a large numerical aperture in order to provide a sufficiently bright image so that the amount of light per pixel remains sufficiently high for detection by an individual CCD. Meanwhile, there has been increasing demand for wider-angle lenses in order to keep the overall length of the lens short despite the market trend of the overall size of the CCD array becoming larger.

It has become more and more difficult to provide a sufficiently wide-angle lens for such an electronic still camera while meeting the requirements of a large numerical aperture and high resolution by using a relatively simple lens system made up of a small number of lens elements.

BRIEF SUMMARY OF THE INVENTION

The object of the present invention is to provide a photographic lens for use in an electronic still camera that has a short overall length, a wide angle of view, a large numerical aperture, and a high resolution as a result of the various aberrations of the photographic lens being favorably corrected.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention is a photographic lens for use in an electronic still camera or the like. The photographic lens has an extremely short overall length which provides a bright, wide-angle image, has a high resolution, and is suitable for an electronic still camera incorporating a CCD having a large number of picture elements.

The photographic lens of the present invention comprises, successively from the object side>, a first component having negative refractive power and at least one aspherical surface, a second component having positive refractive power with a convex surface on the image side, a stop, a third component of positive refractive power having at least one aspherical surface and a convex surface on the image side, a fourth component having negative refractive power and a concave surface on the object side, and a fifth component having positive refractive power and a convex surface on the image side. Preferably, the second lens component includes a biconvex lens element, and the following Conditions are satisfied:

| | |
|---|---|
| $0.4 < f/f_{345} < 0.7$ | Condition (1) |
| $0.6 < f/f_3 < 0.9$ | Condition (2) |
| $1.8 < f/|f_4| < 2.2$ | Condition (3) | where f is the focal length of the photographic lens, $f_{345}$ is the focal length of a composite optical system formed of the third lens component through the fifth lens component, $f_3$ is the focal length of the third lens component, and $f_4$ is the focal length of the fourth lens component.

By making the second lens component a biconvex lens element, its power is increased while minimizing various aberrations.

Conditions (1)–(3) will now be discussed. If the lower limit of Condition (1) is not satisfied, the composite focal length of the three lens components nearest the image side becomes long relative to the focal length of the imaging lens as a whole, the angle of incidence of rays into an image surface becomes large and the quantity of light imaged into the corner areas of the CCD array decreases, so that it becomes difficult to record images using the CCD array. On the other hand, when the upper limit of Condition (1) is exceeded, it becomes difficult to make the overall length of the imaging lens compact.

Concerning Condition (2), if the lower limit is not satisfied, the Petzval sum increases and it becomes difficult to correct the curvature of field. On the other hand, if the upper limit of Condition (2) is exceeded, the back focus will be long, making it difficult to have the overall length of the imaging lens compact.

Concerning Condition (3), if the lower limit is not satisfied, the back focus becomes long, making it difficult to have the overall length of the imaging lens compact. On the other hand, if the upper limit is exceeded, distortion of the image at the peripheral areas of the CCD array becomes excessive.

Figure 1:
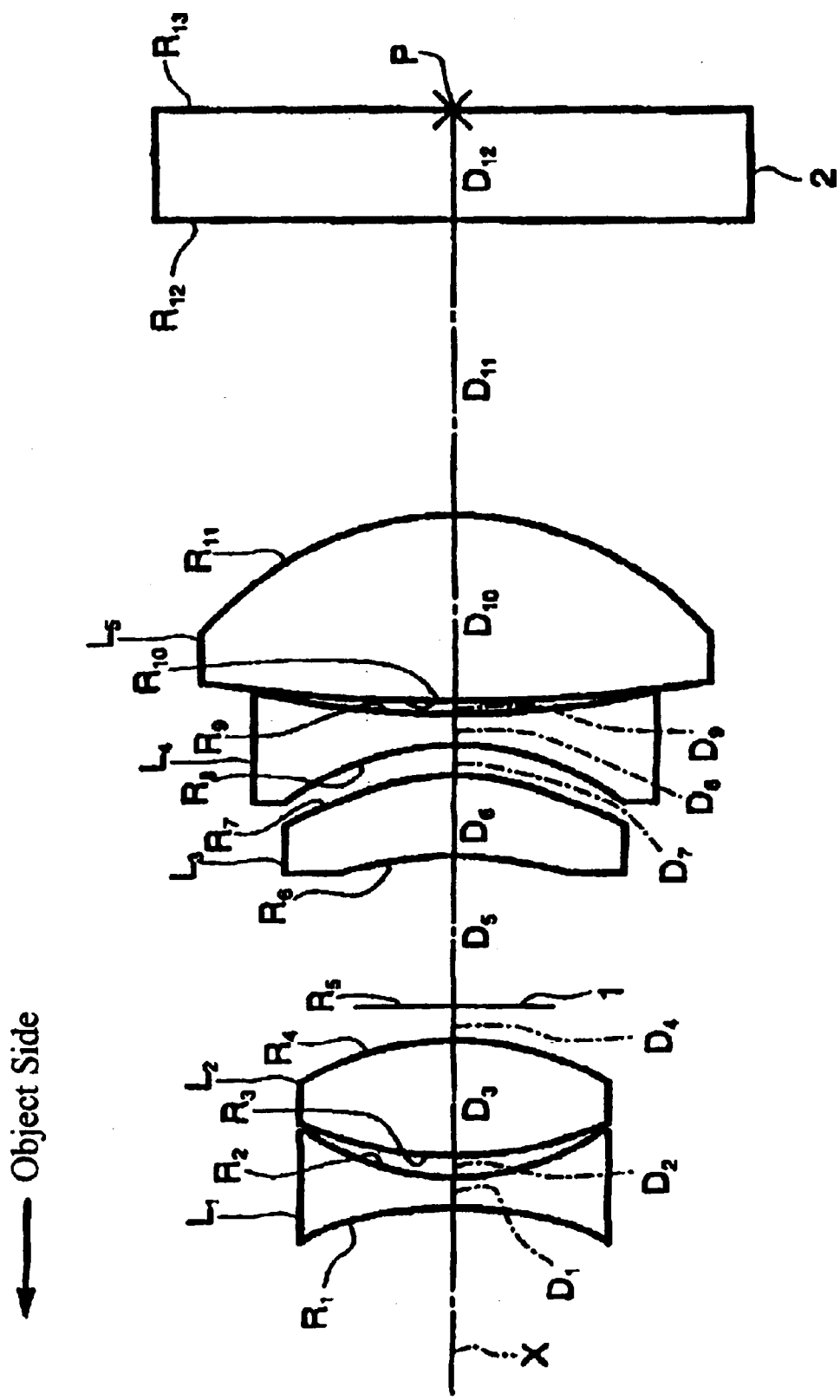
FIG. 1 shows the basic lens component configuration of the photographic lens of the present invention.

FIG. 1 shows the basic lens component configuration according to the present invention. A, shown in FIG. 1, a photographic lens having five successive lens components $L_1$–$L_5$, in order from the object side, images light from an object side of the imaging lens onto a CCD image surface that is centered at a position P along an optical axis X. A cover glass 2 protects the surface of the CCD array, and a stop 1 is positioned between the second lens component $L_2$ and the third lens component $L_3$. The lens component configuration illustrated enables the object of the invention to be achieved.

Namely, the present invention employs: in the first lens component, a negative lens element having at least one aspherical surface; in the second lens component, a positive lens element having a convex surface on the image side; in the third lens component, a positive lens element having at least one aspherical surface with a convex surface on the image side; in the fourth lens component a negative lens element having a concave surface on the object side; and, in the fifth lens component a positive lens element having a convex surface on the image side. As indicated above, a stop is positioned between the second lens component and the third lens component, and the above Conditions (1) to (3) are, preferably, satisfied.

Several specific embodiments of a photographic lens for an electronic still camera according to the present invention will now be set forth in detail.

Embodiment 1

The top portion of Table 1 below lists the surface number # in order from the object side, the radius of curvature R (in mm) of each surface, the on-axis surface spacing D (in mm), as well as the refractive index $N_d$ and Abbe number $v_d$ (at the sodium d line) of each lens element according to Embodiment 1 of the invention. Furthermore, the bottom portion of Table 1 lists the focal length f of the imaging lens, the $F_{NO}$, and the image angle $2\omega$, as well as the specific values obtained for Conditions (1)–(3) for this embodiment.

Those surfaces with a * to the right of the surface number in Table 1 are aspherical surfaces,, and the aspherical surface shape is expressed by Equation (A) below $$Z = CY^2/\{1+(1-KC^2Y^2)^{1/2}\}+A_4Y^4+A_6Y^6+A_8Y^8+A_{10}Y^{10} \quad \text{(Equation A)}$$

where

Z is the length (in mm) of a line drawn from a point on the aspherical surface at distance Y from the optical axis to the tangential plane of the aspherical surface vertex, C (=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

TABLE 1

| # | R | D | $N_d$ | $v_d$ |
|---|---|---|---|---|
| 1* | −8.4864 | 0.50000 | 1.64769 | 33.8 |
| 2* | 4.0938 | 0.35170 | 1.00000 | |
| 3 | 6.1789 | 1.87989 | 1.83481 | 42.7 |
| 4 | −4.9052 | 0.60000 | 1.00000 | |
| 5 | ∞ (stop) | 2.42869 | 1.00000 | |
| 6* | −5.5000 | 1.31871 | 1.80610 | 40.7 |
| 7* | −3.7203 | 0.50022 | 1.00000 | |
| 8 | −4.4947 | 0.50000 | 1.84666 | 23.8 |
| 9 | 14.4910 | 0.22442 | 1.00000 | |
| 10 | 28.5709 | 3.01767 | 1.83481 | 42.7 |
| 11 | −5.3613 | 4.80471 | 1.00000 | |
| 12 | ∞ | 1.78000 | 1.51680 | 64.2 |
| 13 | ∞ | | 1.00000 | | f = 7.95 mm
$F_{NO}$ = 2.8
$2\omega$ = 64 degrees
Condition (1) value: $f/f_{345}$ = 0.583
Condition (2) value: $f/f_3$ = 0.747
Condition (3) value: $f/|f_4|$ = 2.01

The values of each of the constants K and $A_4$–$A_{10}$ of the aspherical surfaces indicated in Table 1 are shown in Table 2.

TABLE 2

| # | K | $A_4$ | $A_6$ | $A_8$ | $A_{10}$ |
|---|---|---|---|---|---|
| 1 | 2.0028795 | −0.3481394 × 10⁻² | 0.1482759 × 10⁻³ | −0.6354846 × 10⁻⁴ | 0.3554606 × 10⁻⁵ |
| 2 | 0.4931924 | −0.5366969 × 10⁻⁵ | 0.4633233 × 10⁻³ | −0.1581623 × 10⁻³ | 0.1310622 × 10⁻⁴ |
| 6 | −0.0995583 | 0.2504798 × 10⁻² | 0.9335844 × 10⁻³ | −0.1414180 × 10⁻³ | 0.2781313 × 10⁻⁵ |
| 7 | 0.4017213 | 0.3480994 × 10⁻² | 0.3135343 × 10⁻³ | 0.3232037 × 10⁻⁴ | −0.7154822 × 10⁻⁵ |

As is clearly shown in Table 1, the photographic lens for an electronic still camera relating to this embodiment satisfies all the above-mentioned Conditions (1)–(3), the total length is short; the $F_{NO}$ is a low 2.8 (thus yielding a bright image), and the image angle $2\omega$ is a wide 64 degrees.

Figure 2:
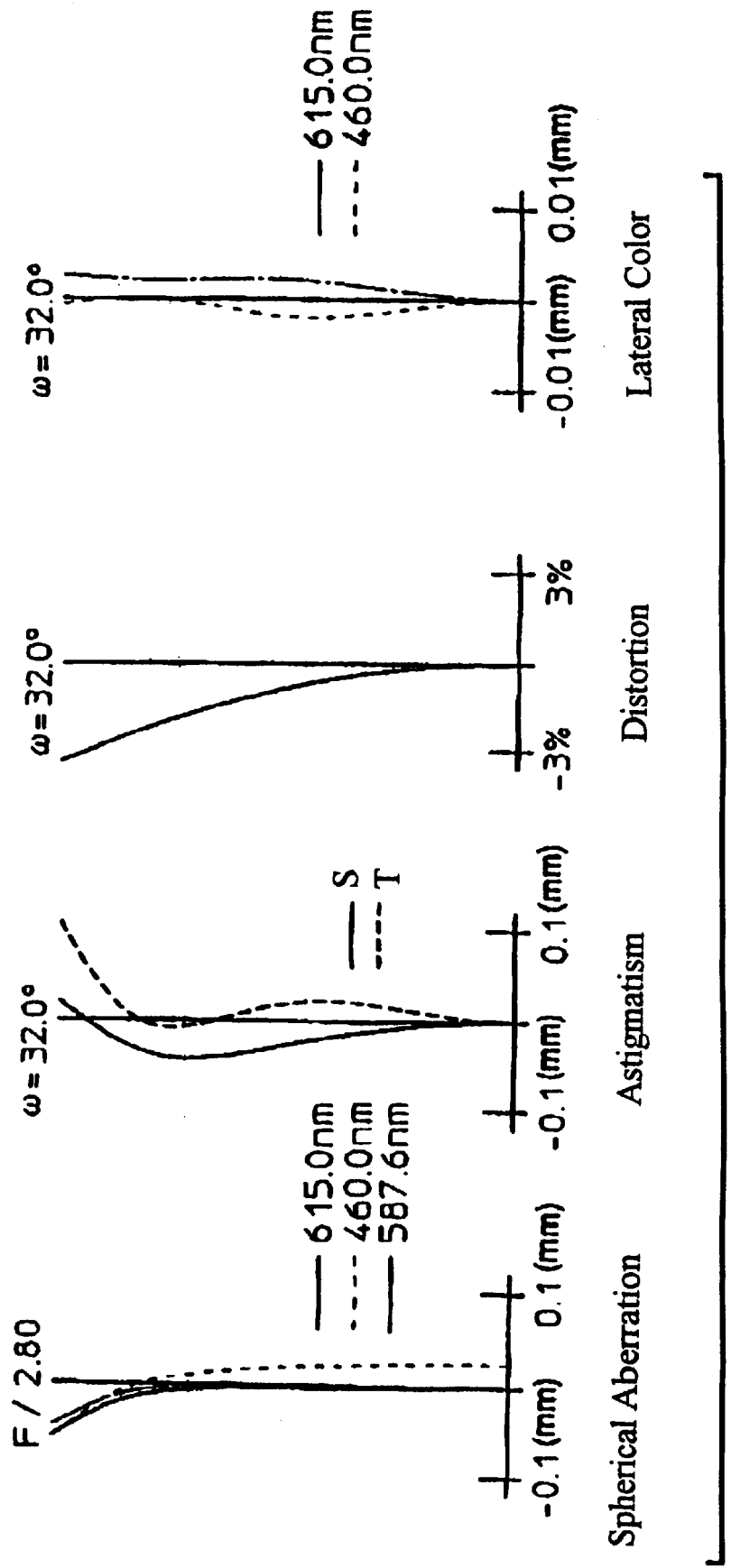
FIG. 2 shows the spherical aberration, astigmatism, distortion, and lateral color of the photographic lens according to Embodiment 1 of the present invention.
Figure 3:
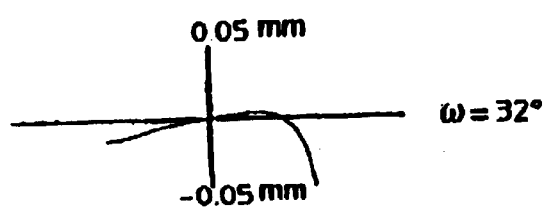
FIG. 3 shows the coma of the photographic lens according to Embodiment 1 of the invention.
Figure 3:
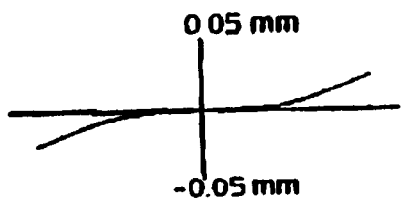
Figure 3:
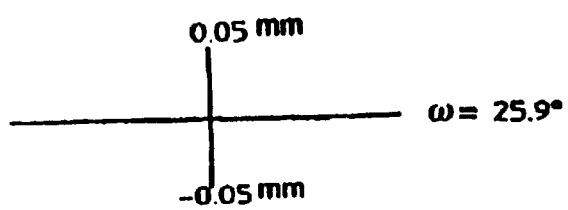
Figure 3:
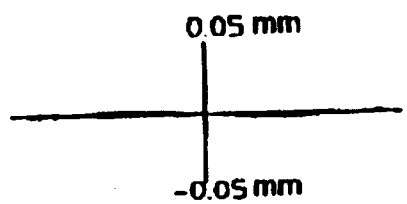
Figure 3:
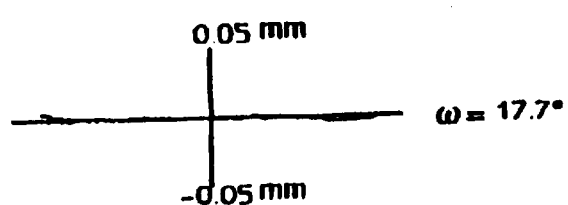
Figure 3:
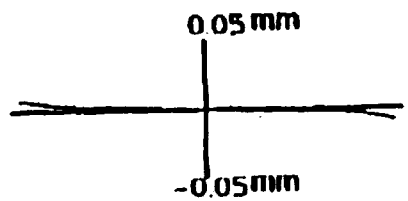
Figure 3:
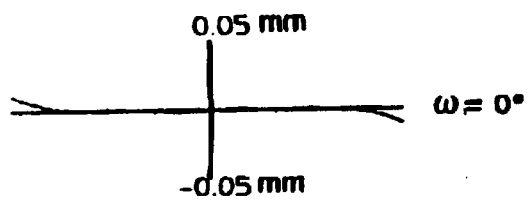

FIG. 2 shows the spherical aberration (in mm) at the listed wavelengths, the astigmatism in both the sagittal S and tangential T planes, the distortion %, and the lateral color at the listed wavelengths of the photographic lens according to Embodiment 1 of the present invention, FIG. 3 shows the coma of the photographic lens according to Embodiment 1 of the invention in the tangential T (left column) and sagittal S (right column) planes as a function of the image angle. Because the sagittal coma curve at $\omega=0°$ does not differ from the tangential coma at $\omega=0°$, there are only three curves in the right column. As is clearly shown in FIGS. 2 and 3, this embodiment provides a photographic lens for an electronic still camera having favorable imaging properties over the entire field of view.

Embodiment 2

The top portion of Table 3 below lists the surface number # in order from the object side, the radius of curvature R (in mm) of each surface, the on-axis surface spacing D (in mm), as well as the refractive index $N_d$ and Abbe number $v_d$ (at the sodium d line) of each lens element according to Embodiment 2 of the invention. Furthermore, the bottom portion of Table 3 lists the focal length f of the imaging lens, the $F_{NO}$, and the image angle $2\omega$, as well as the specific values obtained for Conditions (1)–(3) for this embodiment.

Those surfaces with a * to the right of the surface number in Table 3 are aspherical surfaces, and the aspherical surface shape is expressed by Equation (A) above.

TABLE 3

| # | R | D | $N_d$ | $v_d$ |
|---|---|---|---|---|
| 1* | −9.4169 | 0.50000 | 1.64769 | 33.8 |
| 2* | 4.0706 | 0.41483 | 1.00000 | |
| 3 | 6.6582 | 1.81209 | 1.83481 | 42.7 |
| 4 | −4.8288 | 0.52751 | 1.00000 | |
| 5 | ∞ (stop) | 2.35381 | 1.00000 | |
| 6* | −5.6655 | 1.27192 | 1.80610 | 40.7 |
| 7* | −3.9231 | 0.50109 | 1.00000 | |
| 8 | −4.8683 | 0.50000 | 1.84666 | 23.8 |
| 9 | 12.5212 | 0.21600 | 1.00000 | |
| 10 | 21.8325 | 2.96379 | 1.83481 | 42.7 |
| 11 | −5.6529 | 4.89364 | 1.00000 | |
| 12 | ∞ | 1.78000 | 1.51680 | 64.2 |
| 13 | ∞ | | 1.00000 | | f = 7.95 mm
$F_{NO}$ = 2.8
$2\omega$ = 64 degrees
Condition (1) value: $f/f_{345}$ = 0.525
Condition (2) value: $f/f_3$ = 0.671
Condition (3) value: $f/|f_4|$ = 1.96

The values of each of the constants K and $A_4$–$A_{10}$ of the aspherical surfaces indicated in Table 3 are shown in Table 4.

TABLE 4

| # | K | $A_4$ | $A_6$ | $A_8$ | $A_{10}$ |
|---|---|---|---|---|---|
| 1 | 2.0138888 | −0.3537228 × $10^{-2}$ | −0.9052967 × $10^{-4}$ | −0.1534970 × $10^{-4}$ | 0.1334824 × $10^{-6}$ |
| 2 | 0.5509790 | 0.5223900 × $10^{-3}$ | −0.6805936 × $10^{-4}$ | −0.3360019 × $10^{-4}$ | 0.2238202 × $10^{-5}$ |
| 6 | −0.4438793 | 0.3399553 × $10^{-2}$ | 0.7021907 × $10^{-3}$ | −0.7749326 × $10^{-4}$ | −0.2060855 × $10^{-5}$ |
| 7 | −0.1080309 | 0.2861609 × $10^{-2}$ | 0.2283381 × $10^{-3}$ | 0.4611875 × $10^{-4}$ | −0.7525463 × $10^{-5}$ |

As is clearly shown in Table 3, the photographic lens for an electronic still camera relating to this embodiment satisfies all the above-mentioned Conditions (1)–(3), the total length is short, the $F_{NO}$ is a low 2.8 (thus yielding a bright image), and the image angle $2\omega$ is a wide 64 degrees.

Figure 4:
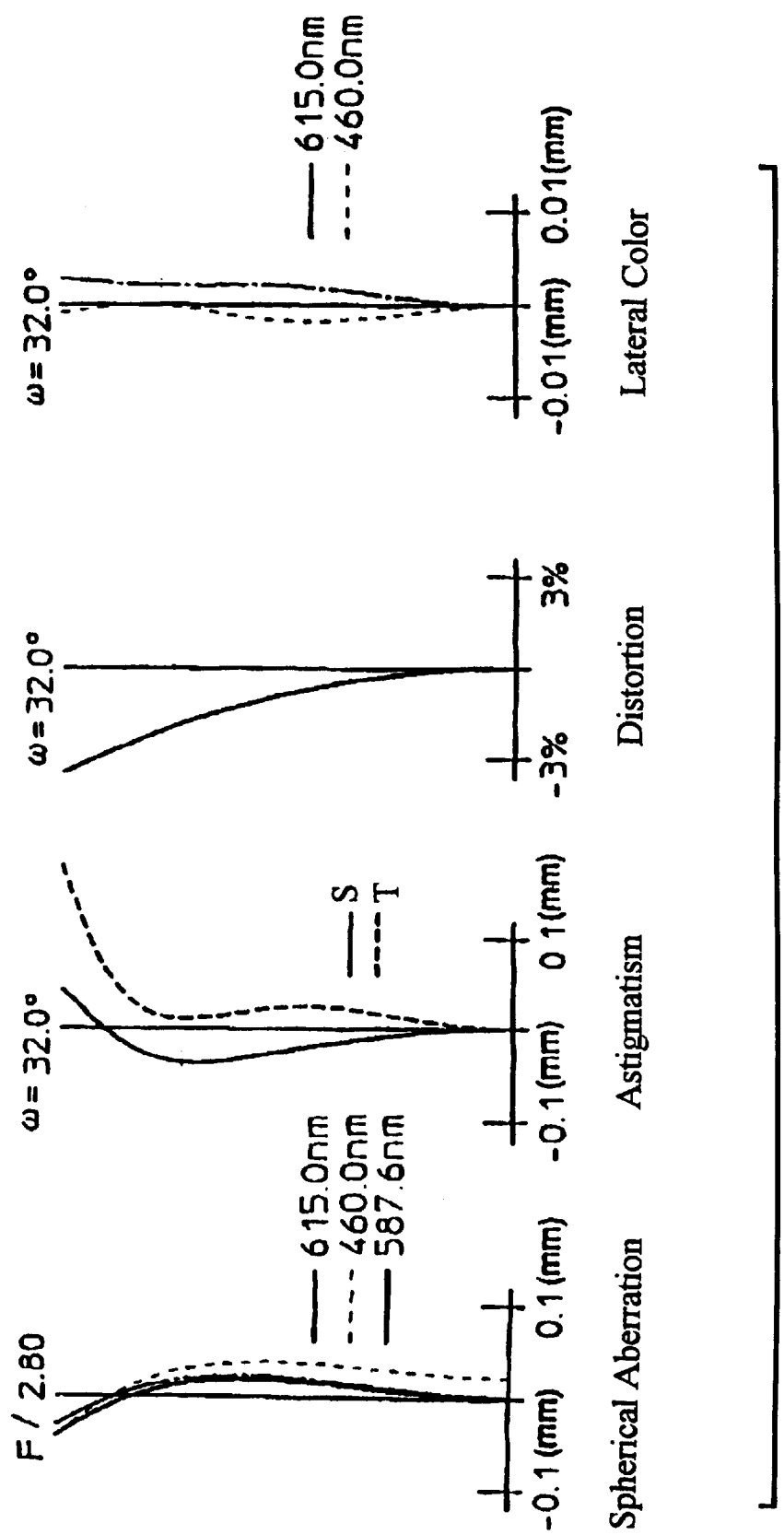
FIG. 4 shows the spherical aberration, astigmatism, distortion, and lateral color of the photographic lens according to Embodiment 2 of the present invention.

FIG. 4 shows the spherical aberration (in mm) at the listed wavelengths, the astigmatism in both the sagittal S and tangential T planes, the distortion %, and the lateral color at the listed wavelengths of the photographic lens according to Embodiment 2 of the present invention.

Figure 5:
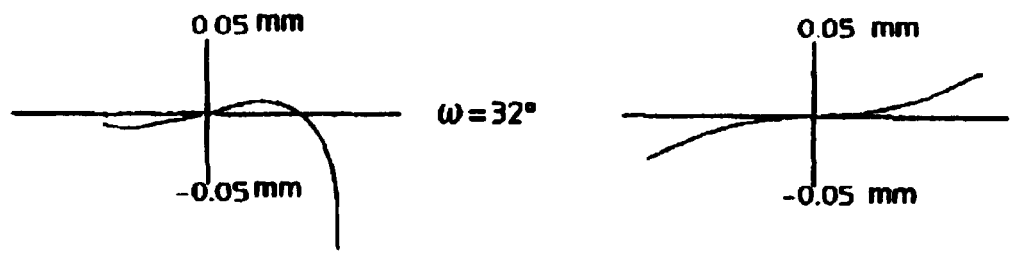
FIG. 5 shows the coma of the photographic lens according to Embodiment 2 of the present invention.
Figure 5:
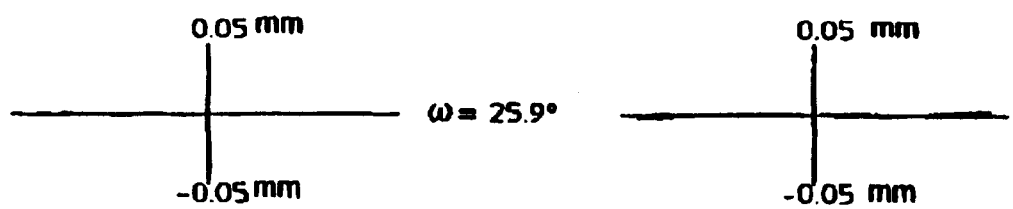
Figure 5:
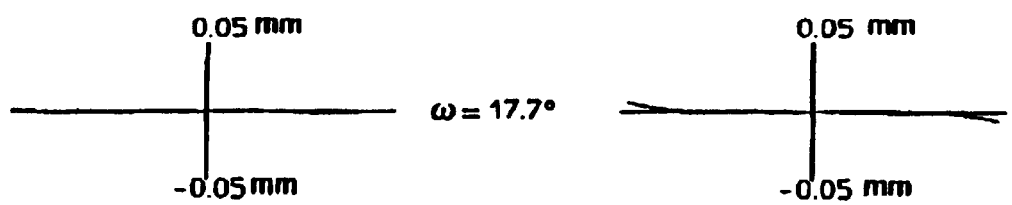
Figure 5:
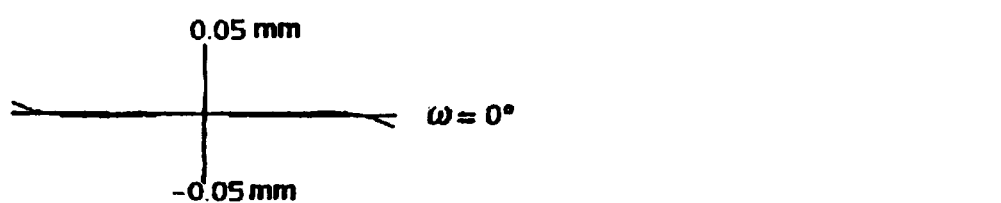

FIG. 5 shows the coma of the photographic lens according to Embodiment 2 of the 5, invention in the tangential T (left column) and sagittal S (right column) planes as a function of the image angle. Because the sagittal coma curve at $\omega=0°$ does not differ from the tangential coma at $\omega=0°$, there are only three curves in the right column. As clearly shown in FIGS. 4 and 5, this embodiment provides a photographic lens for an electronic still camera having favorable imaging properties over the entire field of view.

Embodiment 3

The top portion of Table 5 below lists the surface number # in order from the object side, the radius of curvature R (in mm) of each surface, the on-axis surface spacing D (in mm), as well as refractive index $N_d$ and Abbe number $v_d$ (at the sodium d line) of each lens element according to Embodiment 3 of the invention. Furthermore, the bottom portion of Table 5 lists the focal length f of the imaging lens, the $F_{NO}$, and the image angle $2\omega$, as well as the specific values obtained for Conditions (1)–(3) for this embodiment.

Those surfaces with a * to the right of the surface number in Table 5 are aspherical surfaces, and the aspherical surface shape is expressed by Equation (A) above.

TABLE 5

| # | R | D | $N_d$ | $v_d$ |
|---|---|---|---|---|
| 1* | −8.3740 | 0.50000 | 1.64769 | 33.8 |
| 2* | 4.1725 | 0.30365 | 1.00000 | |
| 3 | 6.0397 | 1.86555 | 1.83481 | 42.7 |
| 4 | −5.0262 | 0.61037 | 1.00000 | |
| 5 | ∞ (stop) | 2.46092 | 1.00000 | |
| 6* | −4.9699 | 1.38991 | 1.80610 | 40.7 |
| 7* | −3.4050 | 0.59011 | 1.00000 | |
| 8 | −4.4015 | 0.50000 | 1.84666 | 23.8 |
| 9 | 15.7131 | 0.21600 | 1.00000 | |
| 10 | 31.9580 | 3.18347 | 1.83481 | 42.7 |
| 11 | −5.3586 | 4.62395 | 1.00000 | |
| 12 | ∞ | 1.78000 | 1.51680 | 64.2 |
| 13 | ∞ | | 1.00000 | | f = 7.96 mm

TABLE 5-continued

| # | R | D | $N_d$ | $v_d$ |
|---|---|---|---|---|

$F_{NO}$ = 2.8
$2\omega$ = 64 degrees
Condition (1) value: $f/f_{345}$ = 0.640
Condition (2) value: $f/f_3$ = 0.834
Condition (3) value: $f/|f_4|$ = 2.00

The values of each of the constants K and $A_4$–$A_{10}$ of the aspherical surfaces indicated in Table 5 are shown in Table 6.

TABLE 6

| # | K | $A_4$ | $A_6$ | $A_8$ | $A_{10}$ |
|---|---|---|---|---|---|
| 1 | 2.002984 | $-0.3652570 \times 10^{-2}$ | $0.2397569 \times 10^{-3}$ | $-0.7167973 \times 10^{-4}$ | $0.3974876 \times 10^{-5}$ |
| 2 | 0.4902395 | $-0.4599566 \times 10^{-3}$ | $0.5444733 \times 10^{-3}$ | $-0.1625769 \times 10^{-3}$ | $0.1319103 \times 10^{-4}$ |
| 6 | -0.0921658 | $0.1621594 \times 10^{-4}$ | $0.1008185 \times 10^{-2}$ | $-0.1258242 \times 10^{-3}$ | $0.1483907 \times 10^{-5}$ |
| 7 | 0.4144171 | $0.2267968 \times 10^{-2}$ | $0.2679303 \times 10^{-3}$ | $0.3484989 \times 10^{-4}$ | $-0.5803231 \times 10^{-5}$ |

As is clearly shown in Table 5, the photographic lens for an electronic still camera relating to this embodiment satisfies all the above-mentioned Conditions (1)–(3), the total length is short; the $F_{NO}$ is a low 2.8 (thus yielding a bright image), and the image angle 2ω is a wide 64 degrees.

Figure 6:
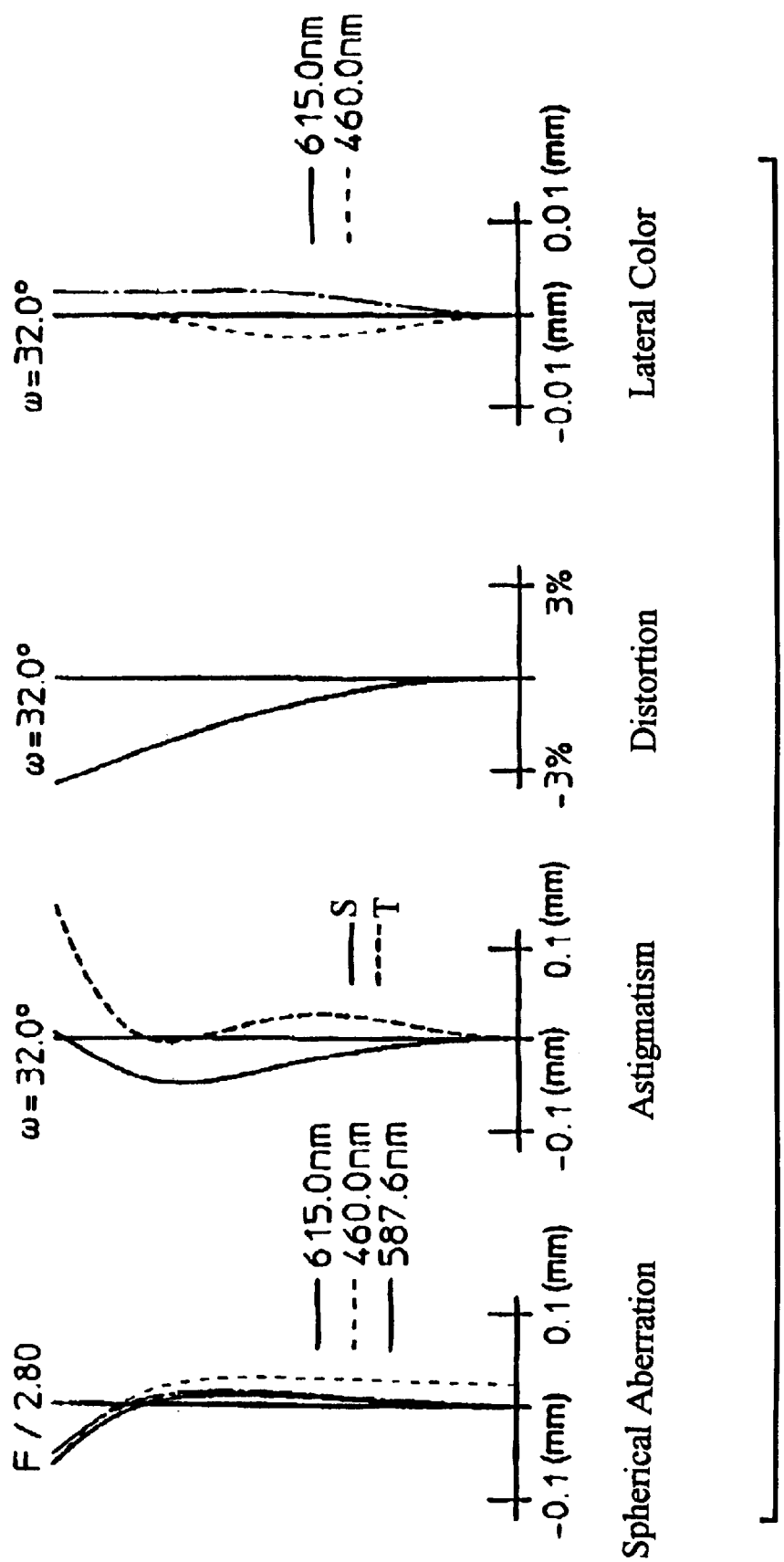
FIG. 6 shows the spherical aberration, astigmatism, distortion, and lateral color of the a photographic lens according to Embodiment 3 of the present invention.

FIG. 6 shows the spherical aberration (in mm) at the listed wavelengths, the astigmatism in both the sagittal S and tangential T planes, the distortion %, and the lateral color at the listed wavelengths of the photographic lens according to Embodiment 3 of the present invention.

Figure 7:
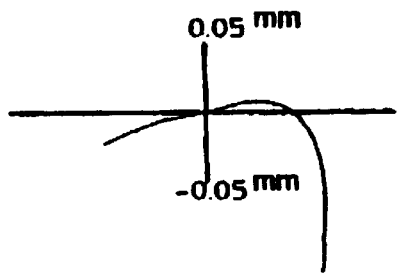
FIG. 7 shows the coma of the photographic lens according to Embodiment 3 of the present invention.
Figure 7:
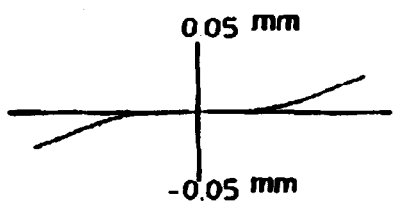
Figure 7:
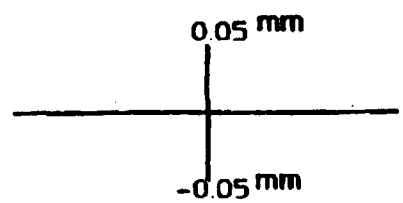
Figure 7:
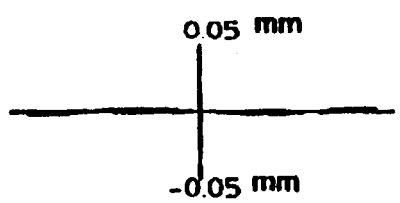
Figure 7:
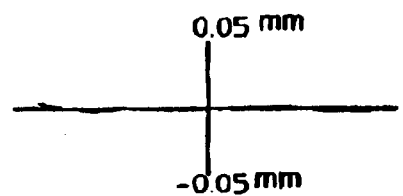
Figure 7:
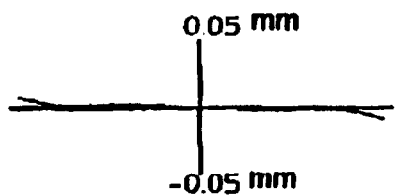
Figure 7:
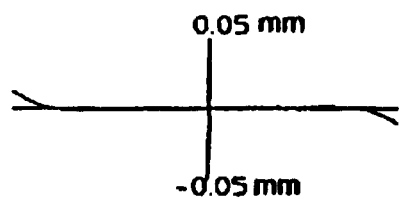

FIG. 7 shows the coma of the photographic lens according to Embodiment 3 of the invention in the tangential T (left column) and sagittal S (right column) planes as a function of image angle. Because the sagittal coma curve at ω=0° does not differ from the tangential coma at ω=0°, there are only three curves in the right column. As is clearly shown in FIGS. 6 and 7, this embodiment provides a photographic lens for an electronic still camera having favorable imaging properties over the entire field of view.

Embodiment 4

The top portion of Table 7 below lists the surface number # in order from the object side, the radius of curvature R (in mm) of each surface, the on-axis surface spacing D (in mm), as well as refractive index $N_d$ and Abbe number $v_d$ (at the sodium d line) of each lens element according to Embodiment 4 of the invention. Furthermore, the bottom portion of Table 7 lists the focal length f of the imaging lens, the $F_{NO}$, and the image angle 2ω, as well as the specific values obtained for Conditions (1)–(3) for this embodiment. Those surfaces with a * to the right of the surface number in Table 7 are aspherical surfaces, and the aspherical surface shape is expressed by Equation (A) above.

TABLE 7

| # | R | D | $N_d$ | $v_d$ |
|---|---|---|---|---|
| 1* | -9.8988 | 0.50000 | 1.64769 | 33.8 |
| 2* | 4.0657 | 0.43298 | 1.00000 | |
| 3 | 6.5519 | 1.86619 | 1.83481 | 42.7 |
| 4 | -4.9689 | 0.61101 | 1.00000 | |
| 5 | ∞ (stop) | 2.25385 | 1.00000 | |
| 6* | -6.3929 | 1.31070 | 1.80610 | 40.7 |

TABLE 7-continued

| # | R | D | $N_d$ | $v_d$ |
|---|---|---|---|---|
| 7* | -3.8413 | 0.47143 | 1.00000 | |
| 8 | -4.3369 | 0.50000 | 1.84666 | 23.8 |
| 9 | 12.9974 | 0.29051 | 1.00000 | |
| 10 | 28.3278 | 2.88018 | 1.83481 | 42.7 |
| 11 | -5.4467 | 4.86058 | 1.00000 | |
| 12 | ∞ | 1.78000 | 1.51680 | 64.2 |
| 13 | ∞ | | 1.00000 | | f = 7.95 mm
$F_{NO}$ = 2.8
2ω = 64 degrees
Condition (1) value: $f/f_{345}$ = 0.534
Condition (2) value: $f/f_3$ = 0.824
Condition (3) value: $f/|f_4|$ = 2.12

The values of each of the constants K and $A_4$–$A_{10}$ of the aspherical surfaces indicated in Table 7 are shown in Table 8 below.

TABLE 8

| # | K | $A_4$ | $A_6$ | $A_8$ | $A_{10}$ |
|---|---|---|---|---|---|
| 1 | 2.0031219 | $-0.3724259 \times 10^{-2}$ | $0.2043428 \times 10^{-3}$ | $-0.7026712 \times 10^{-4}$ | $0.4129832 \times 10^{-5}$ |
| 2 | 0.4920076 | $-0.1764746 \times 10^{-3}$ | $0.6009977 \times 10^{-3}$ | $-0.1891236 \times 10^{-3}$ | $0.1523880 \times 10^{-4}$ |
| 6 | -0.1099498 | $0.2851851 \times 10^{-2}$ | $0.8697337 \times 10^{-3}$ | $-0.1391654 \times 10^{-3}$ | $0.4380509 \times 10^{-5}$ |
| 7 | 0.3280234 | $0.3272193 \times 10^{-2}$ | $0.2910208 \times 10^{-3}$ | $0.2826309 \times 10^{-4}$ | $-0.6524601 \times 10^{-5}$ |

As is clearly shown in Table 7, the photographic lens for an electronic still camera relating to this embodiment satisfies all the above-mentioned Conditions (1)–(3), the total length is short; the $F_{NO}$ is a low 2.8 (thus yielding a bright image), and the image angle 2ω is a wide 64 degrees.

Figure 8:
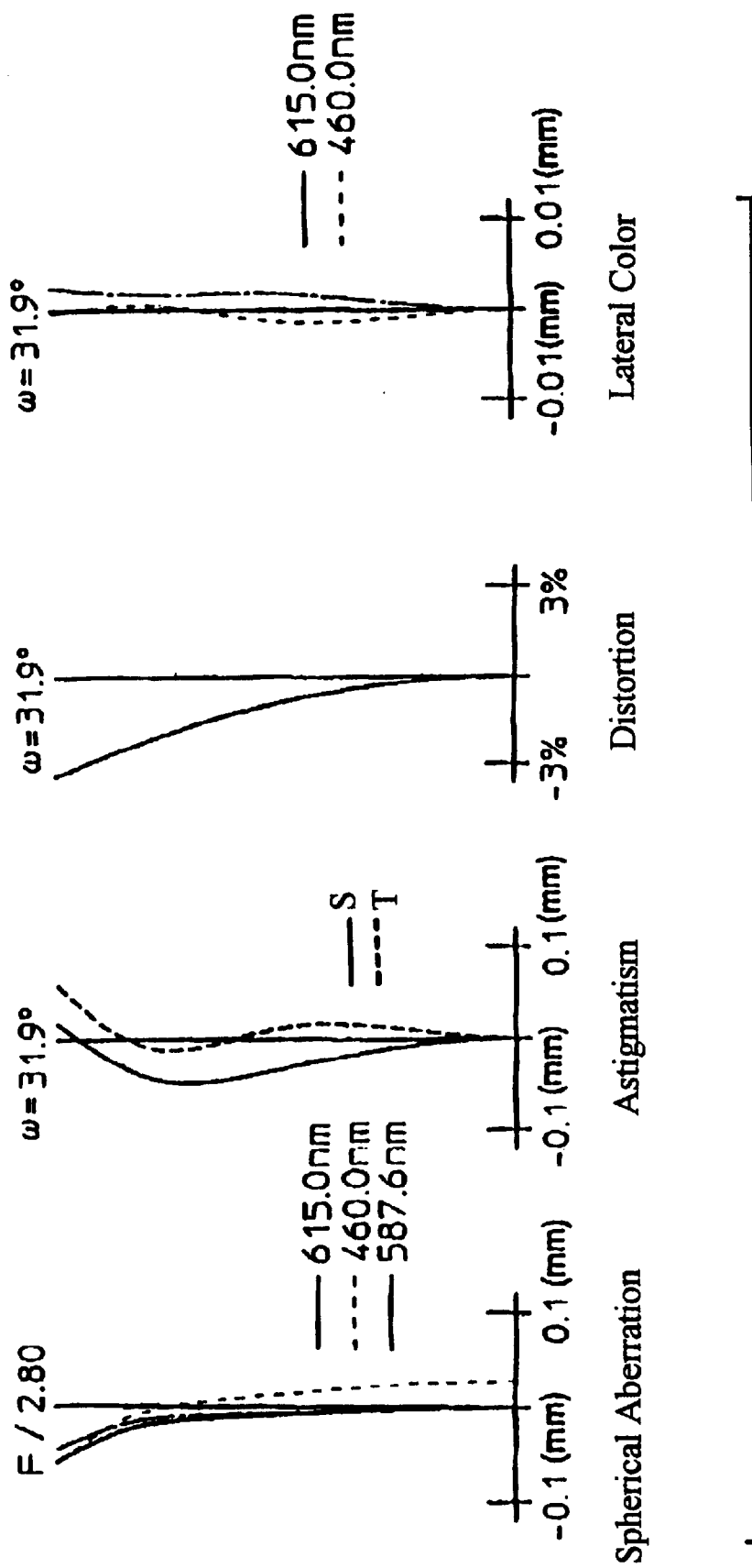
FIG. 8 shows the spherical aberration, astigmatism, distortion, and lateral color of the photographic lens according to Embodiment 4 of the present invention.

FIG. 8 shows the spherical aberration (in mm) at the listed wavelengths, the astigmatism in both the sagittal S and tangential T planes, the distortion %, and the lateral color at the listed wavelengths of the photographic lens according to Embodiment 4 of the present invention.

Figure 9:
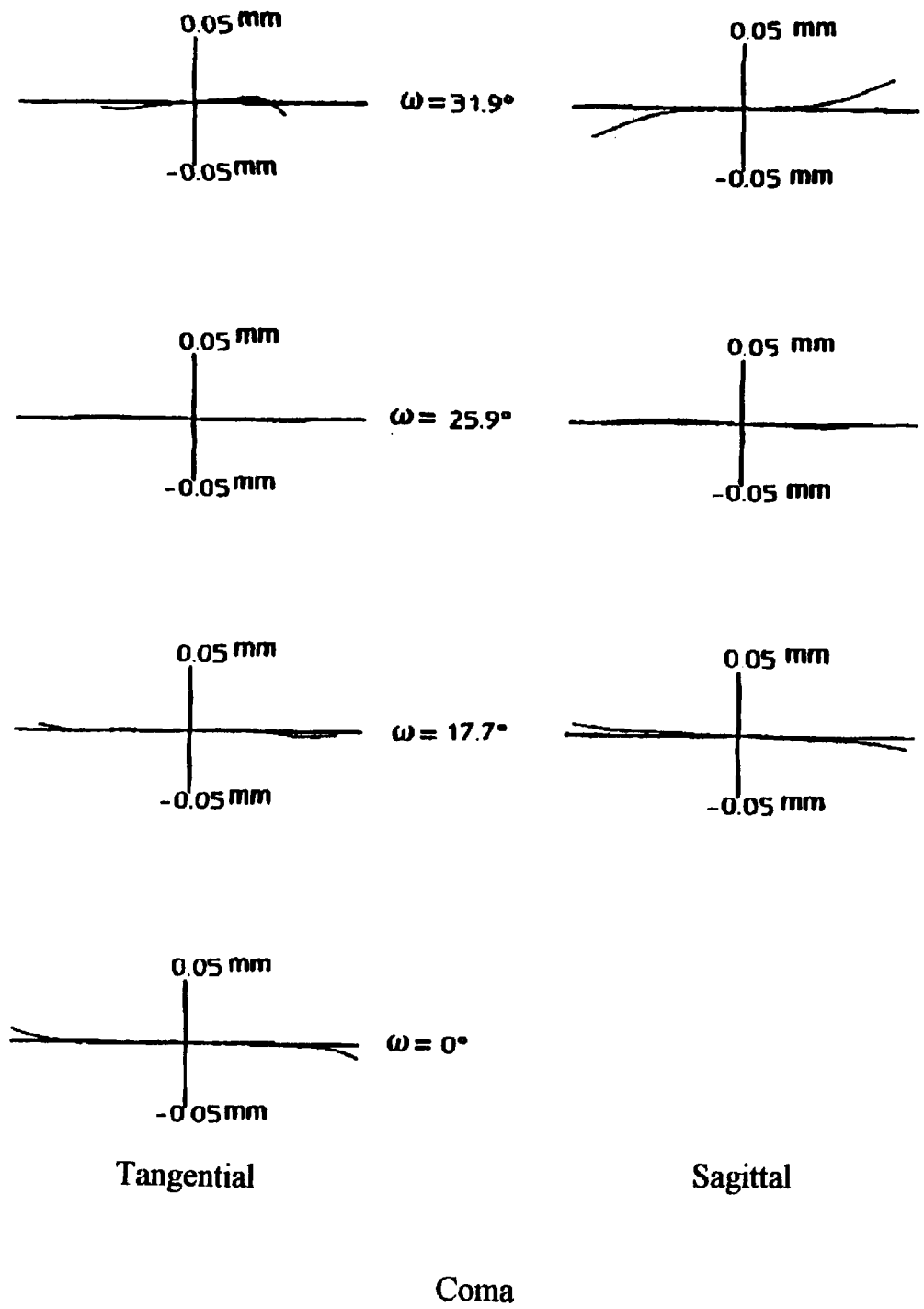
FIG. 9 shows the coma of the photographic lens according to Embodiment 4 of the present invention.

FIG. 9 shows the coma of the photographic lens according to Embodiment 4 of the invention in the tangential T (left column) and sagittal S (right column) planes as a function of image angle. Because the sagittal coma curve at ω=0° does not differ from the tangential coma at ω=0°, there are only three curves in the right column. As is clearly shown in FIGS. 8 and 9, this embodiment provides a photographic lens for an electronic still camera having favorable imaging properties over the entire field of view.

As explained above, the photographic lens for an electronic still camera of the present invention has a short overall length, a wide angle of view, a large numerical aperture, and can favorably correct the various aberrations. Thus, when used as a photographic lens in an electronic still camera, it provides a compact electronic still camera having a wide angle of view with images of high quality and nearly zero distortion.

The invention being thus described, it will be obvious that the same may be varied in many ways. For example, although the various lens components are illustrated as a single lens element in the drawings, one or more of these lens components may instead be formed of two or more lens elements that are joined. Further, only one surface of the above-noted first and third lens components need be aspherical, and one or more additional surfaces may be made aspherical. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A photographic lens for an electronic still camera comprising, in sequential order from the most object side:
    a first lens component having negative refractive power and at least one aspherical surface;
    a second lens component having a positive refractive power and a convex surface on the image side;
    a stop;
    a third lens component having positive refractive power and a convex surface on the image side, said third lens component including an aspherical surface;
    a fourth lens component having negative refractive power and a concave surface on the object side; and,
    a fifth lens component having positive refractive power and a convex surface on the image side.

2. The photographic lens of claim 1, wherein the second lens component is biconvex.

3. The photographic lens of claim 1, wherein the following condition is satisfied:

$$0.4 < f/f_{345} < 0.7$$

where
    f is the focal length of the photographic lens, and
    $f_{345}$ is the composite focal length of the third lens component through the fifth lens component.

4. The photographic lens of claim 3, wherein the following condition is satisfied:

$$0.6 < f/f_3 < 0.9$$

where
    $f_3$ is the focal length of the third lens component.

5. The photographic lens of claim 4, wherein the following condition is satisfied:

$$1.8 < f/|f_4| < 2.2$$

where
    $f_4$ is the focal length of the fourth lens component.

6. The photographic lens of claim 2, wherein the following condition is satisfied:

$$0.4 < f/f_{345} < 0.7$$

where
    f is the focal length of the photographic lens, and
    $f_{345}$ is the composite focal length of the third lens component through the fifth lens component.

7. The photographic lens of claim 6, wherein the following condition is satisfied:

$$0.6 < f/f_3 < 0.9$$

where
    $f_3$ is the focal length of the third lens component.

8. The photographic lens of claim 7, wherein the following condition is satisfied $$1.8 < f/|f_4| < 2.2$$

where
    $f_4$ is the focal length of the fourth lens component.

* * * * *

UNITED STATES PATENT AND TRADEMARK OFFICE
CERTIFICATE OF CORRECTION

PATENT NO. : 6,285,516 B1
DATED : September 4, 2001
INVENTOR(S) : Ori

It is certified that error appears in the above-identified patent and that said Letters Patent is hereby corrected as shown below:

Column 1,
Line 15, change "X&A" to -- XGA --;

Column 2,
Line 4, change "the a photographic" to -- the photographic --;
Line 23, change "side>," to -- side, --;

Column 3,
Line 8, change "A, shown" to -- As shown --;
Line 59, change "surfaces,," to -- surfaces, --;
Line 61, change the line to read as follows:
-- $Z = CY^2 / \{1 + (1 - KC^2Y^2)^{1/2}\} + A_4Y^4 + A_6Y^6 + A_8Y^8 + A_{10}Y^{10}$ ...(Equation A) --;

Column 5,
Line 64, change "of the 5," to -- of the --;

Column 6,
Line 17, change "20 ω" to -- 2 ω --;
Line 55, delete the following lines:

| # | R | D | $N_d$ | $\upsilon_d$ |
|---|---|---|---|---|

-- ; and,

Column 7,
Table 6, change the exponent of the value of $A_4$ for surface #6 from "$10^{-4}$" to -- $10^{-3}$ --.

Signed and Sealed this

Sixth Day of August, 2002

Attest:

JAMES E. ROGAN
Attesting Officer    Director of the United States Patent and Trademark Office